US010803679B2

(12) United States Patent
Abuelsaad et al.

(10) Patent No.: US 10,803,679 B2
(45) Date of Patent: Oct. 13, 2020

(54) GUIDED VEHICLE EVALUATION

(71) Applicant: INTERNATIONAL BUSINESS MACHINES CORPORATION, Armonk, NY (US)

(72) Inventors: Tamer E. Abuelsaad, Somers, NY (US); Gregory J. Boss, Saginaw, MI (US); John E. Moore, Jr., Brownsburg, IN (US); Randy A. Rendahl, Raleigh, NC (US)

(73) Assignee: International Business Machines Corporation, Armonk, NY (US)

( * ) Notice: Subject to any disclaimer, the term of this patent is extended or adjusted under 35 U.S.C. 154(b) by 311 days.

(21) Appl. No.: 15/861,741

(22) Filed: Jan. 4, 2018

(65) Prior Publication Data

US 2019/0206147 A1 Jul. 4, 2019

(51) Int. Cl.
| | | |
|---|---|---|
| G07C 5/00 | (2006.01) | |
| G07C 5/08 | (2006.01) | |
| H04L 29/08 | (2006.01) | |
| H04W 4/44 | (2018.01) | |
| G06Q 10/00 | (2012.01) | |

(52) U.S. Cl.
CPC .......... G07C 5/006 (2013.01); G06Q 10/20 (2013.01); G07C 5/008 (2013.01); G07C 5/0808 (2013.01); H04L 67/12 (2013.01); H04W 4/44 (2018.02); *H04L 2209/38* (2013.01)

(58) Field of Classification Search
CPC ...... G07C 5/006; G07C 5/008; G07C 5/0808; H04W 4/44; G06Q 10/20; H04L 67/12; H04L 2209/38
See application file for complete search history.

(56) References Cited

U.S. PATENT DOCUMENTS

| | | | |
|---|---|---|---|
| 8,543,283 B2 | 9/2013 | Boss et al. | |
| 8,649,932 B2 | 2/2014 | Mian et al. | |
| 9,697,503 B1 * | 7/2017 | Penilla | G06Q 10/20 |

(Continued)

FOREIGN PATENT DOCUMENTS

| | | |
|---|---|---|
| EP | 1583027 A1 | 10/2005 |
| JP | 2006006467 A | 1/2006 |

OTHER PUBLICATIONS

Peter Mell et al, The NIST Definition of Cloud Computing, National Institute of Standards and Technology, Publication 800-145, 2011.

*Primary Examiner* — Sze-Hon Kong
(74) *Attorney, Agent, or Firm* — Patrick J. Daugherty; Daugherty & Del Zoppo Co., LPA

(57) ABSTRACT

A computer-implemented method for guided vehicle evaluation includes executing on a computer processor the step of receiving a vehicle identification number (VIN) for a vehicle and analyzing maintenance items and repair items for the vehicle from anonymized vehicle data identified by the VIN which identifies deviations from normal maintenance items and repair items identified by a decoded VIN. The anonymized vehicle data includes repair items and maintenance items performed on the vehicle and a vehicle mileage for each repair item and for each maintenance item. Expected service needs for the vehicle are computed based on the identified deviations from normal of maintenance items and repair items, and the expected service needs for the vehicle are displayed.

17 Claims, 6 Drawing Sheets

(56) References Cited

U.S. PATENT DOCUMENTS

| | | | |
|---|---|---|---|
| 10,521,780 B1* | 12/2019 | Hopkins, III | G06Q 20/10 |
| 2007/0250229 A1* | 10/2007 | Wu | G06Q 10/06 |
| | | | 701/31.4 |
| 2008/0119983 A1* | 5/2008 | Inbarajan | G07C 5/008 |
| | | | 701/36 |
| 2008/0208609 A1* | 8/2008 | Preece | G06Q 10/06 |
| | | | 705/1.1 |
| 2010/0085193 A1 | 4/2010 | Boss et al. | |
| 2012/0271816 A1* | 10/2012 | Hansberger | G06Q 10/04 |
| | | | 707/722 |
| 2013/0145482 A1* | 6/2013 | Ricci | G06F 3/0484 |
| | | | 726/28 |
| 2014/0046800 A1 | 2/2014 | Chen | |
| 2014/0052328 A1* | 2/2014 | Nguyen | G07C 5/0808 |
| | | | 701/29.6 |
| 2014/0085086 A1* | 3/2014 | Knapp | G06Q 10/06 |
| | | | 340/540 |
| 2014/0188329 A1* | 7/2014 | Chen | G07C 5/008 |
| | | | 701/29.6 |
| 2014/0195100 A1* | 7/2014 | Lundsgaard | G07C 5/0841 |
| | | | 701/29.6 |
| 2014/0229391 A1* | 8/2014 | East, III | G06Q 10/20 |
| | | | 705/305 |
| 2014/0279709 A1 | 9/2014 | Lander et al. | |
| 2015/0105968 A1* | 4/2015 | Ho | G07C 5/008 |
| | | | 701/31.5 |
| 2016/0071334 A1* | 3/2016 | Johnson | G07C 5/0808 |
| | | | 701/29.1 |
| 2016/0097648 A1* | 4/2016 | Hannah | G06K 9/00785 |
| | | | 701/118 |
| 2016/0110934 A1* | 4/2016 | Ernst | G07C 5/085 |
| | | | 701/29.6 |
| 2017/0031997 A1* | 2/2017 | Merg | G07C 5/008 |
| 2017/0267192 A1* | 9/2017 | Chen | B60R 16/0234 |
| 2017/0270490 A1* | 9/2017 | Penilla | G06Q 10/1095 |
| 2017/0305369 A1* | 10/2017 | Ono | B60R 16/0234 |
| 2017/0352082 A1* | 12/2017 | Aziz | G01C 21/362 |
| 2018/0018642 A1* | 1/2018 | Schmitz | G06Q 10/20 |
| 2018/0098203 A1* | 4/2018 | Schultz | G08G 1/096716 |
| 2018/0108058 A1* | 4/2018 | Cotton | G06Q 30/0235 |
| 2018/0232964 A1* | 8/2018 | Chen | G07C 5/008 |
| 2018/0290609 A1* | 10/2018 | Khoo | B60R 16/037 |
| 2019/0066398 A1* | 2/2019 | Sankavaram | G07C 5/085 |
| 2019/0066407 A1* | 2/2019 | Kwak | G07C 5/008 |
| 2019/0130658 A1* | 5/2019 | Johnson | G07C 5/006 |
| 2019/0130668 A1* | 5/2019 | Johnson | G06F 17/2247 |
| 2019/0220861 A1* | 7/2019 | Silver | G06Q 20/401 |
| 2019/0244445 A1* | 8/2019 | Kyes | G07C 5/008 |
| 2019/0251759 A1* | 8/2019 | Lora | H04L 67/26 |

* cited by examiner

GUIDED VEHICLE EVALUATION

BACKGROUND

Evaluating a used vehicle for purchase is difficult for an individual consumer. At a used car lot, the consumer is unaware of the inventory of autos present beforehand and, unless the consumer is a mechanic, the condition of each vehicle can be uncertain.

Conventional practice for evaluating a vehicle condition can include reports of defects or repairs performed for a used car being considered. For example, in one approach, information is available based on a vehicle identification number (VIN) and/or license plate related to defects that have occurred in a vehicle and the reference mileage at which such defects occurred. A VIN is typically represented as an alphanumeric character string. The vehicle is identified by the VIN captured from a display visible through the windshield. The captured VIN is decoded for characteristic data that includes a vehicle year, make (manufacturer) and model.

BRIEF SUMMARY

In one aspect of the present invention, a computer-implemented method for guided vehicle evaluation includes executing on a computer processor the steps of receiving a vehicle identification number (VIN) for a vehicle and analyzing maintenance items and repair items for the vehicle from anonymized vehicle data identified by the VIN, which identifies deviations from normal maintenance items and repair items identified by a decoded VIN. The anonymized vehicle data includes repair items and maintenance items performed on the vehicle and a vehicle mileage for each repair item and for each maintenance item. Expected service needs are computed for the vehicle based on the deviations from normal of maintenance items and repair items, and the expected service needs are displayed for the vehicle.

In another aspect, a system has a hardware processor, computer readable memory in circuit communication with the processor, and a computer-readable storage medium in circuit communication with the processor and having program instructions stored thereon. The processor executes the program instructions stored on the computer-readable storage medium via the computer readable memory and thereby guides vehicle evaluation, which receives a vehicle identification number (VIN) for a vehicle and analyzes maintenance items and repair items for the vehicle from anonymized vehicle data identified by the VIN, which identifies deviations from normal maintenance items and repair items identified by a decoded VIN. The anonymized vehicle data includes repair items and maintenance items performed on the vehicle and a vehicle mileage for each repair item and for each maintenance item. Expected service needs are computed for the vehicle based on the identified deviations from normal of maintenance items and repair items, and the expected service needs are displayed for the vehicle.

In another aspect, a computer program product for guiding vehicle evaluation has a computer-readable storage medium with computer readable program code embodied therewith. The computer readable hardware medium is not a transitory signal per se. The computer readable program code includes instructions for execution by a processor that cause the processor to guide vehicle evaluation, which receives a vehicle identification number (VIN) for a vehicle and analyzes maintenance items and repair items for the vehicle from anonymized vehicle data identified by the VIN, which identifies deviations from normal maintenance items and repair items identified by a decoded VIN. The anonymized vehicle data includes repair items and maintenance items performed on the vehicle and a vehicle mileage for each repair item and for each maintenance item. Expected service needs are computed for the vehicle based on the identified deviations from normal of maintenance items and repair items, and the expected service needs are displayed for the vehicle.

BRIEF DESCRIPTION OF THE DRAWINGS

These and other features of embodiments of the present invention will be more readily understood from the following detailed description of the various aspects of the invention taken in conjunction with the accompanying drawings in which.

DETAILED DESCRIPTION

Figure 1:
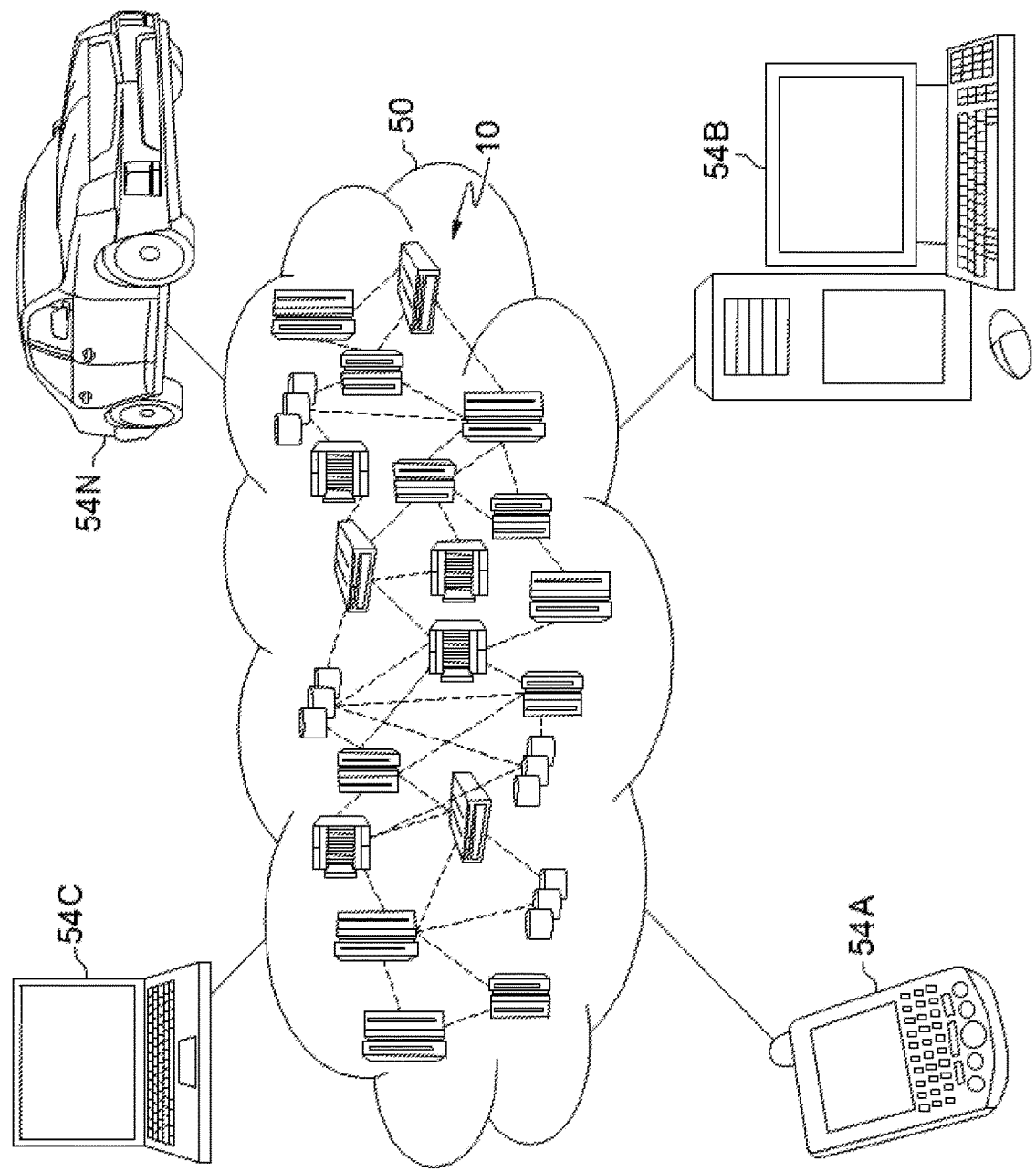
FIG. 1 depicts a cloud computing environment according to an embodiment of the present invention.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general-purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Referring now to FIG. 1, illustrative cloud computing environment 50 is depicted. As shown, cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 1 are intended to be illustrative only and that computing nodes 10 and cloud computing environment 50 can communicate with any type of computerized device over any type of network and/or network addressable connection (e.g., using a web browser).

Figure 2:
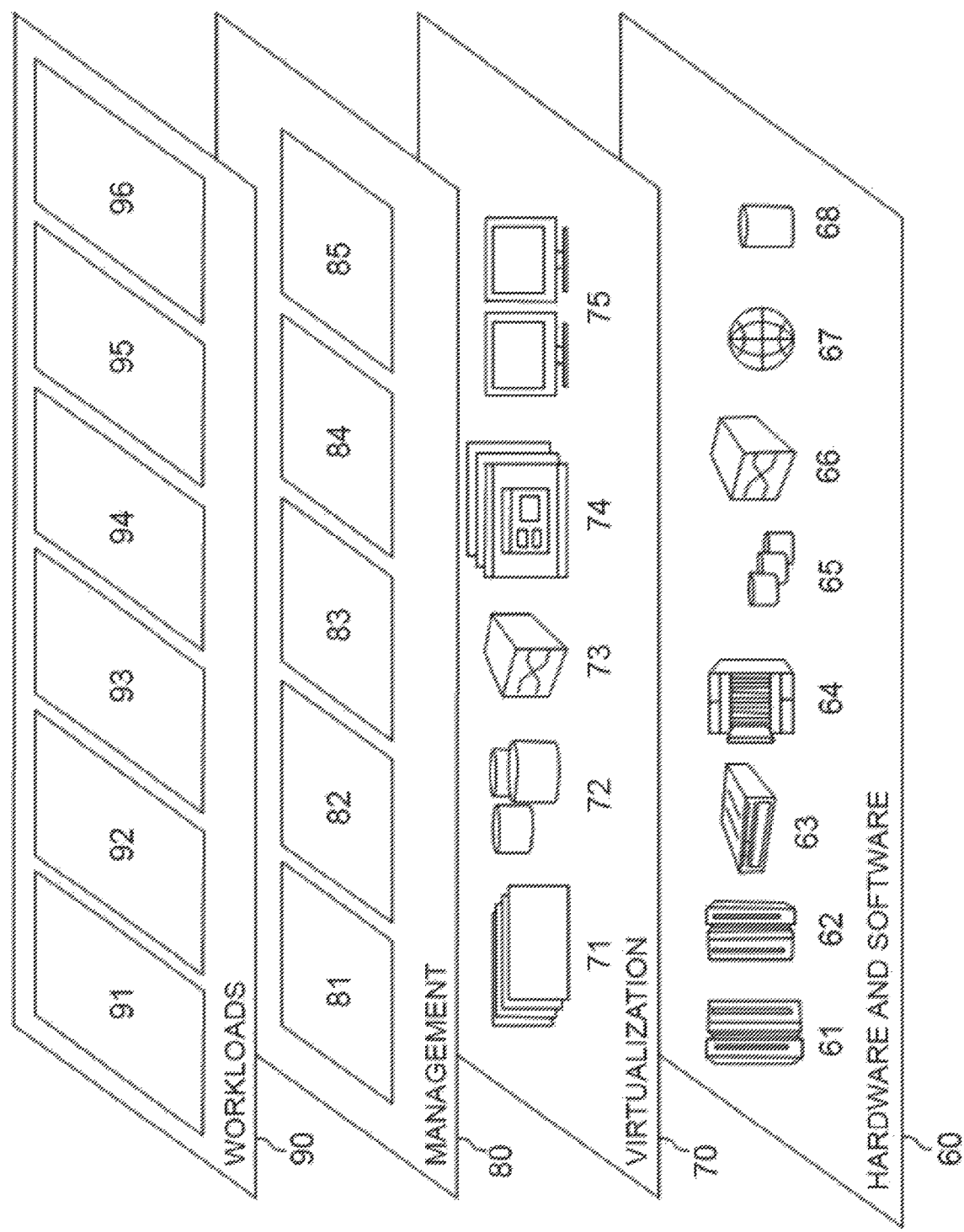
FIG. 2 depicts abstraction model layers according to an embodiment of the present invention.

Referring now to FIG. 2, a set of functional abstraction layers provided by cloud computing environment 50 (FIG. 1) is shown. It should be understood in advance that the components, layers, and functions shown in FIG. 2 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provides pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and processing for guided vehicle evaluation 96.

Figure 3:
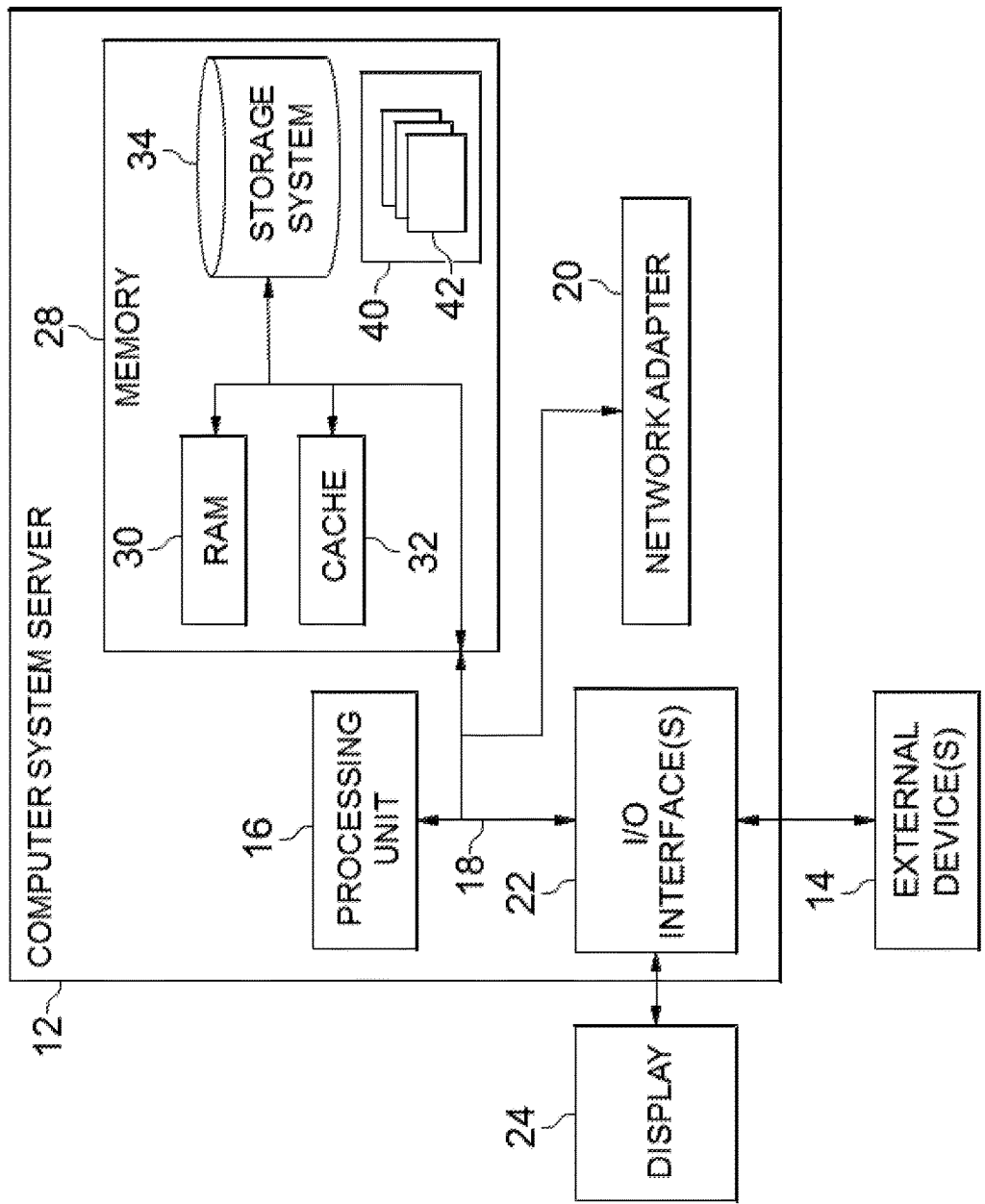
FIG. 3 depicts a computerized aspect according to an embodiment of the present invention.

FIG. 3 is a schematic of an example of a programmable device implementation 10 according to an aspect of the present invention, which may function as a cloud computing node within the cloud computing environment of FIG. 2. Programmable device implementation 10 is only one example of a suitable implementation and is not intended to suggest any limitation as to the scope of use or functionality of embodiments of the invention described herein. Regardless, programmable device implementation 10 is capable of being implemented and/or performing any of the functionality set forth hereinabove.

A computer system/server 12 is operational with numerous other general purpose or special purpose computing system environments or configurations. Examples of well-known computing systems, environments, and/or configurations that may be suitable for use with computer system/server 12 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 12 may be described in the general context of computer system-executable instructions, such as program modules, being executed by a computer system. Generally, program modules may include routines, programs, objects, components, logic, data structures, and so on that perform particular tasks or implement particular abstract data types. Computer system/server 12 may be practiced in distributed cloud computing environments where tasks are performed by remote processing devices that are linked through a communications network. In a distributed cloud computing environment, program modules may be located in both local and remote computer system storage media including memory storage devices.

The computer system/server 12 is shown in the form of a general-purpose computing device. The components of computer system/server 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random access memory (RAM) 30 and/or cache memory 32. Computer system/server 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, memory 28 may include at least one program product having a set (e.g., at least one) of program modules that are configured to carry out the functions of embodiments of the invention.

Program/utility 40, having a set (at least one) of program modules 42, may be stored in memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the invention as described herein.

Computer system/server 12 may also communicate with one or more external devices 14 such as a keyboard, a pointing device, a display 24, etc.; one or more devices that enable a user to interact with computer system/server 12; and/or any devices (e.g., network card, modem, etc.) that enable computer system/server 12 to communicate with one or more other computing devices. Such communication can occur via Input/Output (I/O) interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples, include, but are not limited to: microcode, device drivers, redundant processing units, external disk drive arrays, RAID systems, tape drives, and data archival storage systems, etc.

Figure 4:
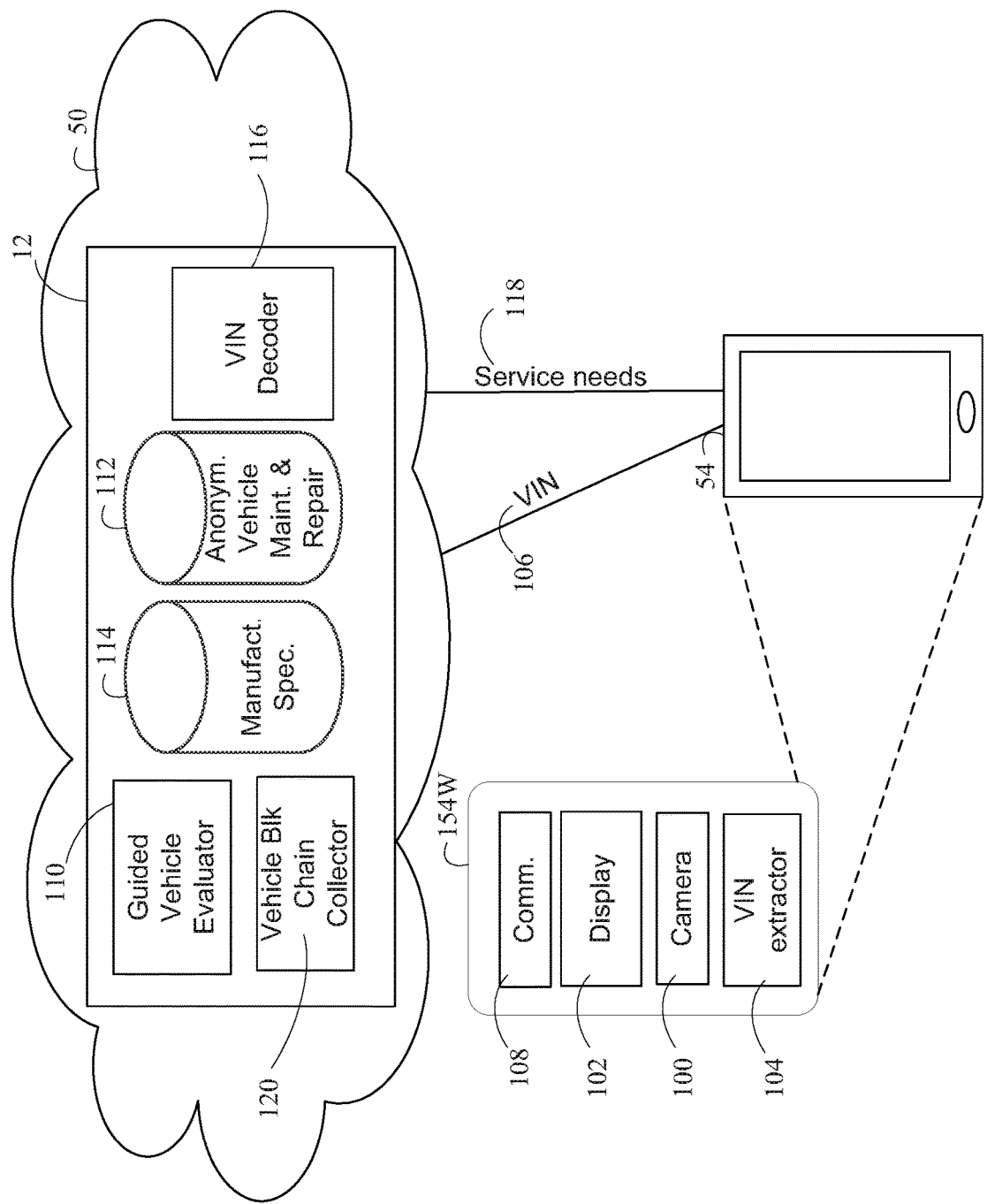
FIG. 4 depicts a schematic illustration of system aspects according to an embodiment of the present invention.

FIG. 4 illustrates schematically a system according to the present invention for the guided vehicle evaluation. The local computing device 54, such as a smart cellular telephone 154W, includes a camera 100 which captures an image of a vehicle viewed through a display 102 and the image includes a vehicle identification number (VIN) 104. A VIN extractor 104 extracts the VIN 106 from the captured image, and a communication device 108 transmits the VIN 106 from the local computing device 54 to the computer system/server 12 via the network.

A guided vehicle evaluator 110 receives the VIN 106 and analyzes maintenance items and repair items for the vehicle from anonymized vehicle data 112 identified by the VIN, which identifies deviations from normal maintenance items and repair items.

Anonymized vehicle data 112 includes maintenance and repairs performed on the vehicle reported with an associated mileage and without ownership identification information. In some embodiments, anonymized vehicle data 112 includes a service indicator, which indicates the qualifications of service providers performing the maintenance and repair items without identifying information for the service providers. For example, the service indicator can include indicators of owner serviced, mechanic serviced, certified mechanic serviced, or dealer certified mechanic serviced. In some embodiments, the guided vehicle evaluator 110 retrieves the anonymized vehicle data 112 from a database via the database software 68.

Maintenance items include adjustments made to a vehicle component(s) and/or replacement of a vehicle component(s) prior to failure. In some instances, maintenance items at the time of service can be based on original manufacturer specifications, component wear indicators, vehicle mileage at the time of service, time from the last service performed, and combinations thereof. The original manufacturer specifications exclude recalled components. For example, maintenance items include such items as oil change, transmission fluid change, brake fluid change, power steering fluid change, radiator cooling fluid change, oil filter change, transmission filter change, cabin air filter change, air conditioning filter change, timing belt adjustment, brake pad replacement, front end wheel alignment, valve adjustment, shock replacement, strut replacement, hybrid battery replacement, electric vehicle battery replacement, tire replacement, and the like. In some instances, maintenance items provide additional information about the state of the vehicle over conventional practice, which is limited to repairs of defects. For example, a transmission fluid change not performed according to the mileage specification of the manufacturer can generate significant wear on transmission components. The lack of a transmission fluid change is not a defect or component failure, and vehicle wear due to lack of a timely transmission fluid change is not readily visible or noticeable to a prospective buyer or an owner considering whether to retain or sell the vehicle.

Repair items include replacement of a vehicle component(s) at the time of failure due to damage or defect, and include replacement of a vehicle component(s) according to recall. For example, a repair item includes a timing belt replacement due to failure or a recall notice.

A VIN decoder 116 decodes the VIN to identify characteristic data of the vehicle from the decoded VIN, such as manufacturer (make), model, and year. In some instances, the decoded VIN can provide characteristic data of vehicle components, such as vehicle engine characteristics. The VIN decoder 116 is embodied by the one or more processors or processing units 16 configured to decode the VIN, which can be on the computer system/server 12, the local processing device 54 and combinations thereof.

The guided vehicle evaluator 110 determines normal for maintenance items and normal repairs items based on manufacturer specifications 114 for the vehicle, probability distributions from the anonymized vehicle data 112 that are also identified by vehicle characteristics, and combinations thereof. The probability distributions provide ranges, such as standard deviations, from probability distributions of anonymized data for other vehicles of a same year, same model, and same manufacturer, probability distributions of anonymized data for other vehicles of a different year, same model and same manufacturer, probability distributions of anonymized data for components of other vehicles that include same components as the vehicle identified from decoding the VIN and manufacturer specifications 114, and combinations thereof. For example, the manufacturer specifications call for a transmission fluid change at a 30,000 mile service, which includes a mileage range of 27,750-32,250 or 30,000±2,250 miles. A probability distribution, such as a normal distribution or Poisson distribution, of other vehicles of the same make, model and year includes a range with two standard deviations (95% of sampled population) of 29,605-34,450 miles. Other measures of probability distributions are contemplated for determining a mileage range, such as variance, skewness, kurtosis, mean, medium, and functions thereof.

Identified deviations from normal maintenance items and repair items include maintenance items and repairs items performed on the vehicle, which are not in the determined normal mileage ranges. For example, a transmission fluid change from the vehicle from the anonymized vehicle data 112 includes mileage of 27,504 which is external to a manufacturer specification range from the manufacturer specifications 114 of 27,750-32,250 and external to a range of 29,605-34,450 determined from a probability distribution of same make, model, and year vehicles from the anonymized vehicle data 112. The deviation from normal maintenance items and repair items includes items performed too soon or too late, such that the mileage for the item is outside of normal.

The analysis by the guided vehicle evaluator 110 includes computing expected service needs 118 for the vehicle. The computed service needs 118 for the vehicle can be computed using univariate or multivariate analysis of variance techniques, linear regression techniques, machine learning techniques, such as neural nets, support vector machines, and combinations thereof. For example, the service need of a component at a current mileage, $Y_c$, can be described as a function of maintenance items $x_1, \ldots, x_n$ and repair items $z_1, \ldots, z_m$ and combinations thereof expressed as deviations from normal, where m and n are greater than or equal to one. The service needs 118 include maintenance items and repair items according to the current or a future mileage of the vehicle. In some embodiments, service needs can be expressed as time, such as months, which is a function of mileage for a vehicle according to time based on historical mileage for the vehicle, user entry of expected annual mileage, or population based annual mileage. The guided vehicle evaluator 110 displays the expected service needs 118 for the vehicle on the display 102 of the local computing device 54.

The guided vehicle evaluator 110 can compute expected costs of the service needs 118 of the vehicle. The service needs 118 include expected repairs and expected maintenance by mileage, which can be converted into a corresponding time period and cost. The expected cost of the service needs 118 is based on characteristic data identified from the decoded VIN in the anonymized vehicle data 112 and dealer specified repair costs and maintenance costs and/or probability distribution of cost from the anonymized vehicle data 112 for other vehicles or components. The probability distributions for cost can be based on anonymized data of maintenance and repair costs for other vehicles of a same year, same model, and same manufacturer; anonymized data of maintenance and repair costs for other vehicles of a different year, same model and same manufacturer; anonymized data of maintenance and repair costs for components of other vehicles that include the same components as the vehicle; and combinations thereof. The guided vehicle evaluator 110 is embodied by the one or more processors or processing units 16 configured to analyze maintenance items and repair items for the vehicle from anonymized vehicle data and compute expected service needs for the vehicle, which can be on the computer system/server 12, the local processing device 54 and combinations thereof.

A vehicle blockchain collector 120 receives repair items and maintenance items performed on the vehicle, and anonymizes the received repair items and maintenance items by removing ownership information. The received maintenance items and repairs items can be received from a variety of sources over the network using crowd sourcing techniques. In some embodiments, the items are received from service providers performing the maintenance item or repair item on the vehicle. In some embodiments, the items are received from the automobile computer system 54N. In some embodiments, the items are received from consumer entry or receipts from service. Each maintenance item and each repair item includes the item of maintenance or repairs and an associated mileage at the point of service. Each maintenance item and each repair item can include a cost. The cost can include parts, labor, fees, and combinations thereof. Each maintenance item and each repair item can include the service indicator indicative of the quality of the service provider performing the maintenance item or repair item.

The vehicle blockchain collector 120 formats and stores the anonymized repair items and maintenance items in system storage 34. In some embodiments, the format and storage includes a blockchain arrangement in the cloud computing environment 50 with previous repair items and maintenance items performed on the vehicle. For example, a block includes all the maintenance items and services items per vehicle service or mileage, blocks of fixed size with a varying number of maintenance items and repair items per block, and combinations thereof. Blocks can include hash information of a prior stored block, which is encrypted and stored using cryptographic processing techniques, such as public-key cryptography. Storage of the blocks is across the network in the cloud computing environment 50 and can include a plurality of the computer system/servers 12. The blockchain arrangement across the network provides for authentication across a plurality of parties and a higher degree of transparency over conventional practice. The vehicle blockchain collector 120 is embodied by the one or more processors or processing units 16 configured to anonymize the repair items and maintenance items, and format and store the anonymized repair and maintenance items in a blockchain arrangement, which can be on the computer system/server 12 or a plurality of the computer system/servers 12.

Figure 5:
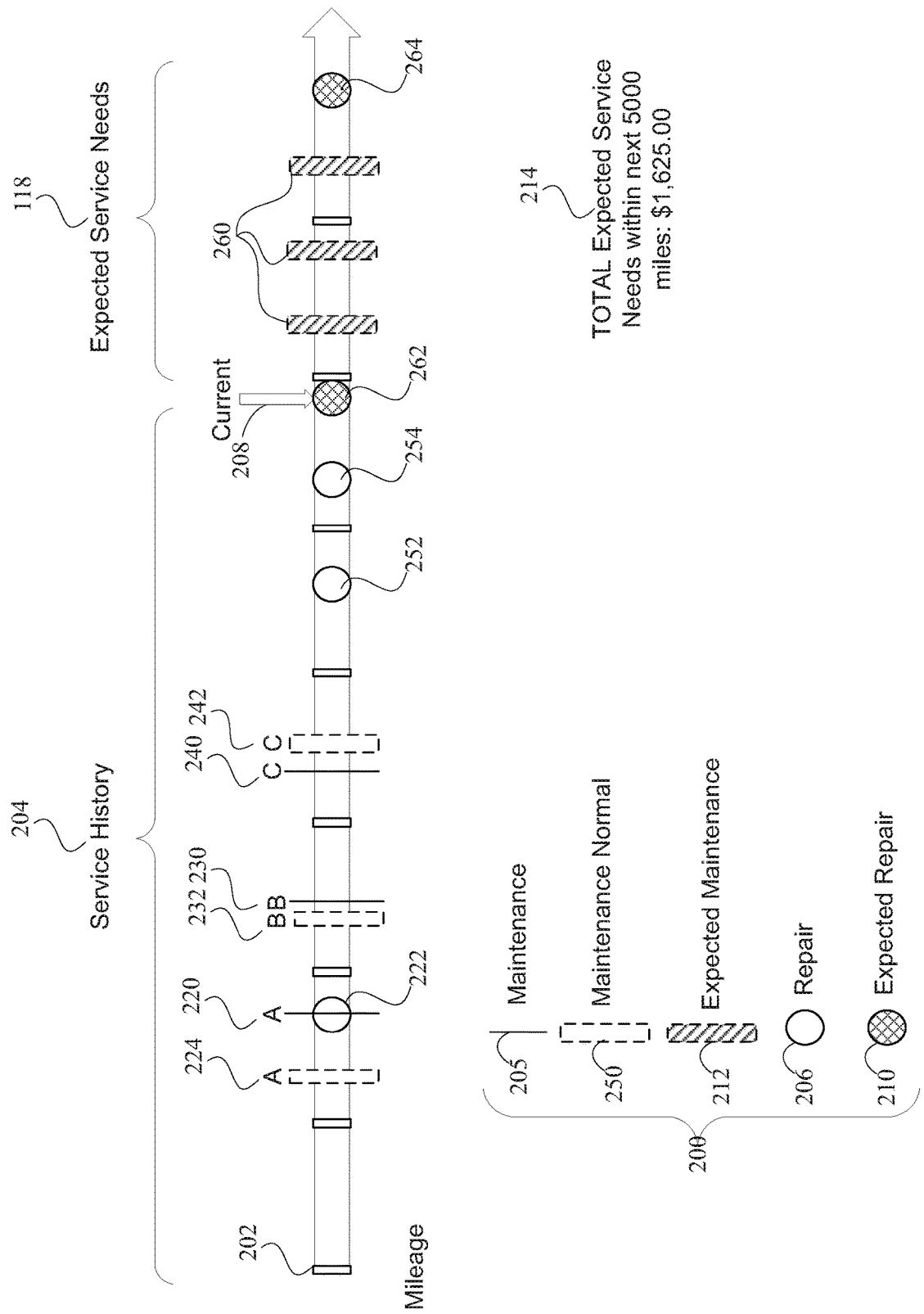
FIG. 5 depicts an example display of a guided vehicle evaluation according to an embodiment of the present invention.

FIG. 5 depicts an example display of a guided vehicle evaluation according to an embodiment of the present invention which illustrates the expected service needs 118. The example display includes indicators 200 of maintenance items and repair items indicated along a horizontal line 202 according to mileage. Service history 204 includes indicators of maintenance items 205 and indicators of repair items 206 performed prior to a current mileage 208. The display illustrates expected service needs 118 with indicators of expected repair items 210 and indicators of maintenance items 212 at the current mileage 208 and/or at a future mileage. The display illustrates expected service needs 118 with an expected total cost within a next mileage range 214.

In some embodiments, the expected total cost within a next mileage range 214 can include user preferences for a threshold financial cost, repairs only, a user specified mileage range, the normal, and combinations thereof. For example, the user specifies next 10,000 miles, repair items more than $150, and normal includes anonymized vehicle data 112 of a same make, model, and year.

The indicators 200 can include different shapes, colors, text, pattern, intensity, icons, and combinations thereof. In some embodiments, the difference in indicators can include expected cost. For example, indicators of a color red can include repairs greater than a threshold cost. In some embodiments, user preferences provide the threshold cost. In some embodiments, the difference in indicators can include different components of the vehicle. For example, a fan icon can indicate repair items or maintenance items related to a cooling subsystem, and a chain icon can indicate repair items or maintenance items related to a drive train subsystem.

The display illustrates indicators of maintenance 204, in which each maintenance item deviates from the normal. The display illustrates an indicator of a first maintenance item 220, A, performed at a service that also includes a first repair item 222. The first maintenance item 220 deviates from an indicator of a first normal maintenance item 224 that corresponds to the normal for the maintenance item A. That is, the maintenance item A was performed after normal maintenance of A for anonymized vehicle data 112 and/or manufacturer specifications 114. An indicator of a second maintenance item 230, B, illustrated at a later mileage, indicates maintenance for item B was performed after normal maintenance for B, which is indicated with an indicator of normal B 232. An indicator of a third maintenance item 240, C, was performed prior to normal maintenance for C, which is indicated with indicator for normal C 242. In some embodiments, indicators of normal maintenance 250 are omitted. In some embodiments, user preferences that include user entry, select the normal and/or select types of maintenance items included or excluded. For example, a user entry, such as checked boxes, selects comparison with manufacturer specifications 114, and includes only maintenance items related to engine and drive train subsystems. In another example, a user entry selects comparison with anonymized vehicle data 112 of a same make and model independent of year, and excludes engine and drive train subsystems.

Other repair indicators 206 indicate a second repair item 252 and a third repair item 254. In some embodiments, user preferences select the normal and select components included or excluded.

In the displayed portion of expected service needs 118, the indicators of expected maintenance 212 according to the horizontal line 202 can indicate manufacturer specifications 114 for maintenance or anonymized vehicle data 112. Three indicators of expected maintenance 260 are illustrated in the display. In some embodiments, the indicators of expected maintenance are omitted. In some embodiments, the total expected cost can include or exclude the cost of expected maintenance. In the displayed portion of expected service needs 118, a first indicator of a first expected repair item 262 is indicated at the current mileage 206 and a second indicator of a second expected repair item 264 is indicated at a later mileage. The first indicator 262 indicator indicates that the first expected repair item 262 is highly likely based on comparison with normal. The second indicator 264 indicates that a future repair is likely according to the indicated mileage compared to normal. The normal can include the manufacturer specifications 114 and/or the probability distribution of anonymized vehicle data 112.

In some embodiments, selecting one of the indicators on the horizontal line 202 can provide a pop-up window, which provides further details for the basis for the selected indicator. For example, selecting the indicator of the first expected repair item 262 provides details of the first repair item, such as the component, the expected cost, the basis of the expected cost, normal ranges for the repair item, combinations thereof and the like. That is, a timing belt replacement at a cost of $185 includes labor and parts based on anonymized vehicle data 112 of same make, model and year vehicles, and an expected repair range between 47,500-68,300 miles with an average mileage at replacement of 54,550 miles.

In some embodiments, the horizontal line 202 is according to time. In some embodiments, indicators of expected maintenance items 212 are omitted. In some embodiments, indicators 200 are based on a financial cost of the maintenance item or repair item. That is, repair items or maintenance items below a threshold cost are omitted. In some embodiments, indicators of maintenance items 204 are omitted when performed according to manufacturer specifications 114 or within the mileage range according to the probability distribution of anonymized vehicle data 112. In some embodiments, repair items and maintenance items are omitted unless directed to a specific vehicle subsystem or component. For example, repair items and maintenance items are omitted unless directed to the engine subsystem. Subsystems can include engine, drive train, braking, electrical and cooling. Combinations of the above expressed at various levels of granularity are contemplated. For example, user preferences, which can be dynamic, indicate display of indicators of maintenance items 204 for the engine and cooling subsystem that deviate from normal maintenance items for vehicles of a same make, model and year. In another example, user preferences indicate display of indicators for repair items 206, omission of maintenance items 204 and expected items 212, and inclusion of expected service needs for repair items more than $250, with an overall total cost of expected service needs.

Figures 6, 7:
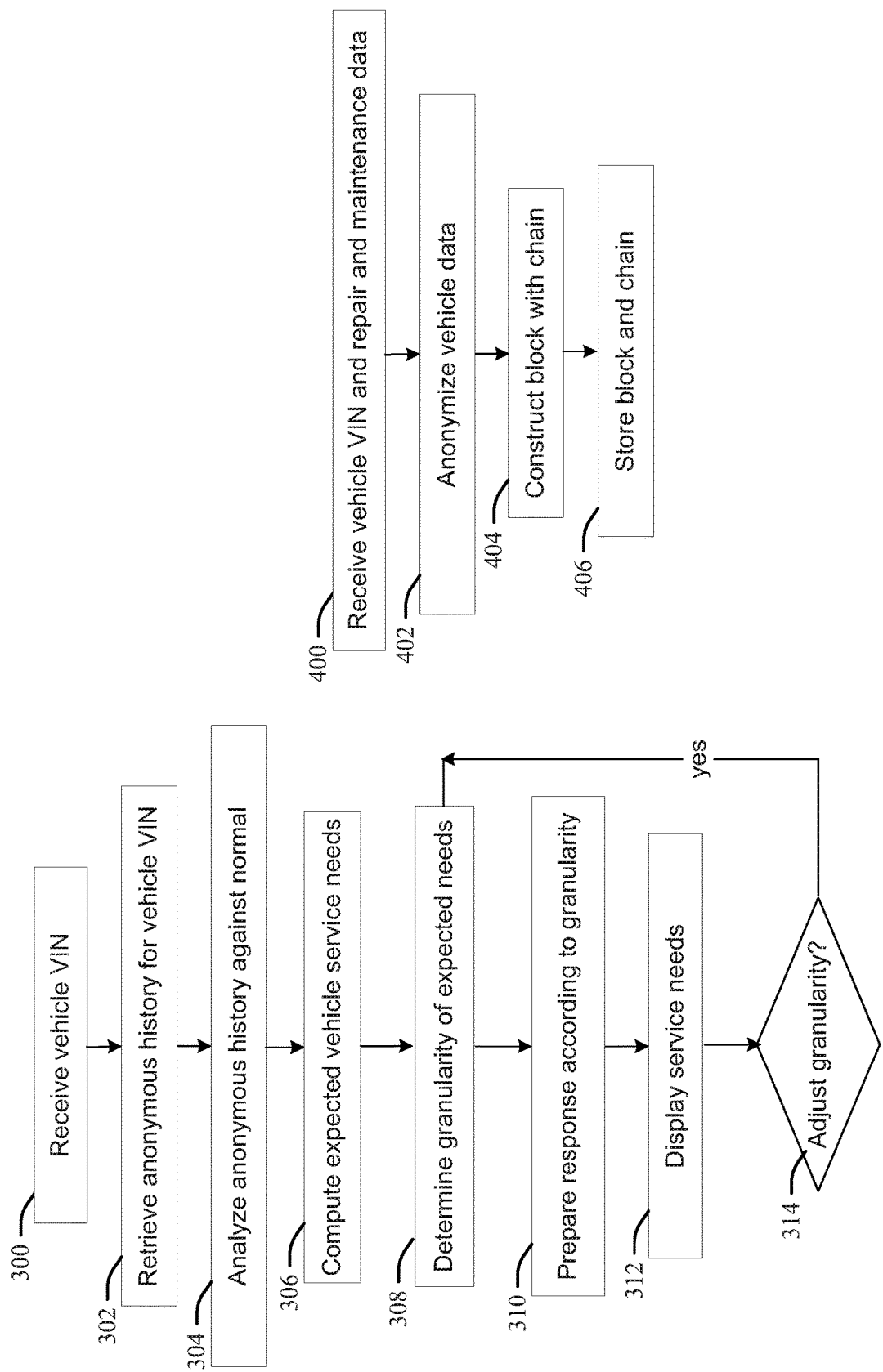
FIG. 6 is a flow chart illustration of an embodiment of the present invention.
FIG. 7 is a flow chart illustration of another embodiment of the present invention.

FIG. 6 illustrates one embodiment of a method according to the present invention for guiding vehicle evaluation. At 300, a processor that is configured according to an aspect of the present invention (the "configured processor") receives a vehicle VIN. The VIN can be received via electronic communication from the local computing device at 54, such as one of the cloud computing nodes 10. The configured processor may be implemented in accordance with the computer system server 12 of FIG. 3, including as the cloud node 10 of FIG. 1, as described respectively above.

At 302, the configured processor retrieves anonymized history from the anonymized vehicle data 112 for a vehicle according to the VIN. The anonymized vehicle data 112 includes repair items and maintenance items performed on the vehicle and a vehicle mileage for each repair item and for each maintenance item. The maintenance items include items replaced or adjusted prior to failure excluding recalled items.

At 304, the configured processor analyzes maintenance items and repair items for the vehicle from anonymized vehicle data identified by the VIN, which identifies deviations from normal maintenance items and repair items identified by a decoded VIN. The normal maintenance items and repair items can be based on one or more of the manufacturer specifications 114 for the vehicle and one or more probability distributions from the anonymized vehicle data 112. The probability distributions from the anonymized vehicle data 112 can include similar vehicles or similar components, such as same year, make and model; different year, make and model, or vehicles and/or components that include the same components as the vehicle. In some embodiments, normal is selected from a system default, user configuration, user preferences, user input, and combinations thereof.

At 306, the configured processor computes the expected service needs 118 for the vehicle based on the deviations from normal of the maintenance items and repair items. The expected service needs can include a cost per item for each maintenance item or repair item. The expected cost can be based on dealer pricing and/or cost data from the anonymized vehicle data 112.

At 308, the configured processor determines granularity of the expected service needs 118 based on defaults, system configuration, user preferences, user input and combinations thereof. The granularity indicates which of the indicators 200 are displayed and the conditions for display or omission. The granularity can indicate which items are included in the expected service needs. The granularity can indicate which items are included in the expected cost.

At 310, the configured processor prepares a display according to the determined granularity. In some embodiments, the display includes a total cost of service needs. In some embodiments, the display includes a horizontal line of mileage and one or more indicators of service needs 118, such as illustrated in FIG. 5.

At 312, the configured processor displays the prepared display of the expected service needs 118 for the vehicle on the display 102 of the local computing device 54.

At 314, the configured processor in a decision step, can receive input to adjust the granularity of the displayed service needs. With the received input, the configured processor can repeat the acts of 308-312 with different granularity. In instances, the input can provided finer detail or drill down aspects of the various indicators 200.

FIG. 7 illustrates another embodiment of a method according to the present invention for guiding vehicle evaluation. At 400, the configured processor receives vehicle repair items and/or maintenance items for a vehicle VIN. The received repair items and/or maintenance items for the vehicle include a mileage associated with the repair items and/or maintenance items. The received repair items and/or maintenance items can include the indicator of the quality of the service provider performing the service on the vehicle.

At 402, the configured processor anonymizes the received repair items and/or maintenance items by removing ownership information.

At 404, the configured processor formats a block which includes the received repair items and/or maintenance items. The formatted block can include a hash of stored previous repair items and maintenance items. In some embodiments, the block format includes a blockchain arrangement, which can include cryptographically encoding the formatted block.

At 406, the configured processor stores the formatted block in the anonymized vehicle data 112.

The terminology used herein is for describing particular aspects only and is not intended to be limiting of the invention. As used herein, the singular forms "a", "an" and "the" are intended to include the plural forms as well, unless the context clearly indicates otherwise. It will be further understood that the terms "include" and "including" when used in this specification specify the presence of stated features, integers, steps, operations, elements, and/or components, but do not preclude the presence or addition of one or more other features, integers, steps, operations, elements, components, and/or groups thereof. Certain examples and elements described in the present specification, including in the claims, and as illustrated in the figures, may be distinguished, or otherwise identified from others by unique adjectives (e.g. a "first" element distinguished from another "second" or "third" of a plurality of elements, a "primary" distinguished from a "secondary" one or "another" item, etc.) Such identifying adjectives are generally used to reduce confusion or uncertainty, and are not to be construed to limit the claims to any specific illustrated element or embodiment, or to imply any precedence, ordering or ranking of any claim elements, limitations, or process steps.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computer-implemented method for guided vehicle evaluation, comprising executing on a computer processor the steps of:
   receiving a vehicle identification number (VIN) for a vehicle;
   identifying maintenance items and repair items performed on the vehicle within vehicle data identified by the VIN, wherein the vehicle data associates the repair items and the maintenance items performed on the vehicle to vehicle mileage values for each repair item and for each maintenance item;
   anonymizing the vehicle data repair items and maintenance items performed on the vehicle by removing vehicle ownership information;
   formatting and storing the anonymized vehicle data repair items and maintenance items in a blockchain arrangement;
   determining a probability distribution of mileage values that are each associated with a performance of a first item of the maintenance items and the repair items upon a plurality of other vehicles that each share a same attribute value with the vehicle that is selected from the group consisting of a year of manufacture, a vehicle model, a vehicle manufacturer and an identification of a component that is maintained, repaired or replaced by the first item;
   determining that a future service event is likely to be required for the vehicle based on a deviation of a mileage value associated with a performance of the first item within the anonymized vehicle data from the probability distribution of mileage values; and
   displaying the future service event for the vehicle.

2. The method of claim 1, wherein the determining that the future service event is likely to be required for the vehicle is further a function of determining that the mileage value associated with the performance of the first item or a time of performance of the first item fail to meet a normal manufacturer specifications maintenance requirement for the vehicle.

3. The method of claim 1, wherein maintenance items include a component prior to failure that is replaced or adjusted, and excludes recalled components.

4. The method of claim 1, further including:
   computing an expected cost of the future service event for the vehicle, wherein the future service event comprises expected repairs and expected maintenance by mileage, wherein the expected cost of the future service event is based on characteristic data identified from the anonymized vehicle data and a probability distribution of cost values that are each associated with a performance of the future service event upon a plurality of other vehicles that each share a same attribute value with the vehicle that is selected from the group consisting of a year of manufacture, a vehicle model, a vehicle manufacturer and an identification of a component that is maintained, repaired or replaced by the future service event.

5. The method of claim 1, wherein the displaying the future service event for the vehicle comprises displaying a graphical display of expected repairs and expected maintenance ordered by mileage of the vehicle that visually distinguishes a mileage value associated with the performance of the first item from a range of mileage values defined by the determined probability distribution of mileage values.

6. The method of claim 1, further comprising:
   integrating computer-readable program code into a computer system comprising a processor, a computer readable memory in circuit communication with the processor, and a computer-readable storage medium in circuit communication with the processor; and
   wherein the processor executes program code instructions stored on the computer-readable storage medium via the computer readable memory and thereby performs the steps of identifying the maintenance items and repair items performed on the vehicle within vehicle data identified by the VIN, anonymizing the vehicle data, formatting and storing the anonymized vehicle data in the blockchain arrangement, determining the probability distribution of mileage values that are each associated with the performance of the first item of the maintenance items and the repair items, determining that the future service event is likely to be required for the vehicle and displaying the future service event for the vehicle.

7. The method of claim 6, wherein the computer-readable program code is provided as a service in a cloud environment.

8. A system for guiding vehicle evaluation, comprising:
   a processor;
   a computer readable memory in circuit communication with the processor; and
   a computer readable storage medium in circuit communication with the processor;
   wherein the processor executes program instructions stored on the computer-readable storage medium via the computer readable memory and thereby:
   receives a vehicle identification number (VIN) for a vehicle;
   identifies maintenance items and repair items performed on the vehicle within vehicle data identified by the VIN, wherein the vehicle data associates the repair items and the maintenance items performed on the vehicle to vehicle mileage values for each repair item and for each maintenance item;
   anonymizes the vehicle data repair items and maintenance items performed on the vehicle by removing vehicle ownership information;
   formats and stores the anonymized vehicle data repair items and maintenance items in a blockchain arrangement;
   determines a probability distribution of mileage values that are each associated with a performance of a first item of the maintenance items and the repair items upon a plurality of other vehicles that each share a same attribute value with the vehicle that is selected from the group consisting of a year of manufacture, a vehicle model, a vehicle manufacturer and an identification of a component that is maintained, repaired or replaced by the first item;
   determines that a future service event is likely to be required for the vehicle based on a deviation of a mileage value associated with a performance of the first item within the anonymized vehicle data from the probability distribution of mileage values; and
   displays the future service event for the vehicle.

9. The system of claim 8, wherein the processor executes program instructions stored on the computer-readable storage medium via the computer readable memory and thereby determines that the future service event is likely to be required for the vehicle as a function of determining that the mileage value associated with the performance of the first item or a time of performance of the first item fail to meet a normal manufacturer specifications maintenance requirement for the vehicle.

10. The system of claim 8, wherein the processor executes program instructions stored on the computer-readable storage medium via the computer readable memory and thereby:
computes an expected cost of the future service event for the vehicle, wherein the future service event comprises expected repairs and expected maintenance by mileage, wherein the expected cost of the future service event is based on characteristic data identified from the anonymized vehicle data and a probability distribution of cost values that are each associated with a performance of the future service event upon a plurality of other vehicles that each share a same attribute value with the vehicle that is selected from the group consisting of a year of manufacture, a vehicle model, a vehicle manufacturer and an identification of a component that is maintained, repaired or replaced by the future service event.

11. The system of claim 8, wherein the processor executes program instructions stored on the computer-readable storage medium via the computer readable memory and thereby displays the future service event for the vehicle by displaying a graphical display of expected repairs and expected maintenance ordered by mileage of the vehicle.

12. The system of claim 11, wherein the graphical display of expected repairs and expected maintenance is ordered by mileage of the vehicle and further comprises indicators of identified deviations from normal maintenance items and repair items.

13. A computer program product for guiding vehicle evaluation, the computer program product comprising:
a computer readable storage medium having computer readable program code embodied therewith, wherein the computer readable storage medium is not a transitory signal per se, the computer readable program code comprising instructions for execution by a processor that cause the processor to:
receive a decoded vehicle identification number (VIN) for a vehicle;
identify maintenance items and repair items performed on the vehicle within vehicle data identified by the VIN, wherein the vehicle data associates the repair items and the maintenance items performed on the vehicle to vehicle mileage values for each repair item and for each maintenance item;
anonymize the vehicle data repair items and maintenance items performed on the vehicle by removing vehicle ownership information;
format and store the anonymized vehicle data repair items and maintenance items in a blockchain arrangement;
determine a probability distribution of mileage values that are each associated with a performance of a first item of the maintenance items and the repair items upon a plurality of other vehicles that each share a same attribute value with the vehicle that is selected from the group consisting of a year of manufacture, a vehicle model, a vehicle manufacturer and an identification of a component that is maintained, repaired or replaced by the first item;
determine that a future service event is likely to be required for the vehicle based on a deviation of a mileage value associated with a performance of the first item within the anonymized vehicle data from the probability distribution of mileage values; and
display the future service event for the vehicle.

14. The computer program product of claim 13, wherein the instructions for execution cause the processor to determine that the future service event is likely to be required for the vehicle as a function of determining that the mileage value associated with the performance of the first item or a time of performance of the first item fail to meet a normal manufacturer specifications maintenance requirement for the vehicle.

15. The computer program product of claim 13, wherein the instructions for execution cause the processor to:
compute an expected cost of the future service event for the vehicle, wherein the future service event comprises expected repairs and expected maintenance by mileage, wherein the expected cost of the future service event is based on characteristic data identified from the anonymized vehicle data and a probability distribution of cost values that are each associated with a performance of the future service event upon a plurality of other vehicles that each share a same attribute value with the vehicle that is selected from the group consisting of a year of manufacture, a vehicle model, a vehicle manufacturer and an identification of a component that is maintained, repaired or replaced by the future service event.

16. The computer program product of claim 13, wherein the instructions for execution cause the processor to display the future service event for the vehicle by displaying a graphical display of expected repairs and expected maintenance ordered by mileage of the vehicle that visually distinguishes a mileage value associated with the performance of the first item from a range of mileage values defined by the determined probability distribution of mileage values.

17. The computer program product of claim 16, wherein the graphical display of expected repairs and expected maintenance ordered by mileage of the vehicle further comprises indicators of identified deviations from normal maintenance items and repair items.

* * * * *